(12) United States Patent
Hall

(10) Patent No.: US 8,201,870 B2
(45) Date of Patent: Jun. 19, 2012

(54) FAIRING MOUNTING SYSTEM

(75) Inventor: Gregory S. Hall, Bothell, WA (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 12/582,594

(22) Filed: Oct. 20, 2009

(65) Prior Publication Data

US 2011/0089716 A1   Apr. 21, 2011

(51) Int. Cl.
*B62D 35/00* (2006.01)
*B60R 3/00* (2006.01)

(52) U.S. Cl. .................... 296/180.2; 296/180.1

(58) Field of Classification Search ............... 296/180.2, 296/180.5, 180.1, 180.3, 180.4, 182.1, 191; 280/768, 849, 762; *B62D 35/00; B60R 3/00*
See application file for complete search history.

(56) References Cited

U.S. PATENT DOCUMENTS

| | | | |
|---|---|---|---|
| 4,611,847 A * | 9/1986 | Sullivan | 296/180.2 |
| 4,746,160 A | 5/1988 | Wiesemeyer | |
| 4,775,179 A * | 10/1988 | Riggs | 296/180.2 |
| 4,784,424 A | 11/1988 | Wiley, Jr. | |
| 4,817,976 A * | 4/1989 | Kingsley | 280/154 |
| 4,925,235 A * | 5/1990 | Fingerle | 296/180.2 |
| 4,991,906 A * | 2/1991 | Fingerle | 296/180.2 |
| 5,609,384 A | 3/1997 | Loewen | |
| 5,788,321 A * | 8/1998 | McHorse et al. | 296/180.1 |
| 5,921,617 A | 7/1999 | Loewen | |
| 6,276,748 B1 * | 8/2001 | Gobessi et al. | 296/190.02 |
| 6,886,882 B2 * | 5/2005 | Farlow et al. | 296/180.4 |
| 6,932,419 B1 * | 8/2005 | McCullough | 296/180.1 |
| 2008/0185869 A1 | 8/2008 | Stegawski | |

* cited by examiner

*Primary Examiner* — Glenn Dayoan
*Assistant Examiner* — Sunsurraye Westbrook
(74) *Attorney, Agent, or Firm* — Christensen O'Connor Johnson Kindness PLLC

(57) ABSTRACT

A fairing assembly is suitable for use with a heavy duty vehicle having a cab mounted to a frame, wherein relative motion occurs between the cab and the frame during vehicle operation. The fairing assembly extending downwardly from a lower portion of the cab and includes a fairing panel and a hinge for hingedly connecting an upper portion of the fairing panel to a lower portion of the cab. The hinge defines a hinge line extending in a generally longitudinal direction. The fairing assembly further includes a link having a first end rotatably connected to a lower portion of the fairing panel and a second end rotatably connected to the frame. The link substantially limits rotation of the fairing panel about the hinge line and rotates relative to the fairing panel to allow for relative motion between the frame and the cab.

12 Claims, 4 Drawing Sheets

FAIRING MOUNTING SYSTEM

BACKGROUND

Semi-trailer trucks often include one or more fairing panels that extend downwardly from an area near the bottom of the cab or sleeper portion of the vehicle. These panels increase the aerodynamic efficiency of the vehicles, thereby improving fuel economy and reducing operating costs. The panels also improve the aesthetics of the vehicles by concealing vehicle components, such as fuel tanks, fluid lines, frame components, etc., that would otherwise be visible.

FIG. 1 shows a typical fairing under-cab installation for a known semi-trailer truck. The vehicle 10 includes a chassis frame 12 supported by a plurality of wheels 14. A cab 16 is located on a forward end of the frame 12 to provide a vehicle operator with an enclosure from which to operate the vehicle 10. An optional sleeper 18 extends from a rear portion of the cab 16 to provide sleeping quarters and a living space for the vehicle operator. A fairing panel 20 is mounted to the vehicle frame 12 to extend downwardly from an area just below the cab 16 and the sleeper 18.

The cab 16 and the sleeper 18 are mounted to the frame 12 with a suspension in order to provide a smoother ride for the vehicle operator. As a result, relative motion necessarily occurs between the cab 16 and the frame 12 and between the sleeper 18 and the frame 12 during vehicle operation. Because the fairing panel 20 is mounted to the frame 12, relative motion also occurs between the cab 16 and the fairing panel 20 and between the sleeper 18 and the fairing panel 20. To accommodate this relative motion, the fairing panel 20 is mounted to the frame 12 so that a gap 22 exists between the fairing panel 20 and the cab 16 and between the fairing panel 20 and the sleeper 18. The gap 22 allows the cab 16 and the sleeper 18 to move relative to the frame 12, and thus the fairing panel 20, during vehicle operation. This in turn prevents unwanted contact between the fairing panel 20 and the cab 16 and/or sleeper 18.

While the above-described fairing system provides improved aerodynamic efficiency and improved vehicle aesthetics, the gap between the fairing panel and the cab and sleeper causes undesirable aerodynamic drag. Further, the gap allows structure that would ideally be concealed to be visible from outside of the truck. Owners and operators of semi-trailer trucks would find it desirable to provide a fairing assembly that eliminates this gap, thereby improving both the aerodynamic efficiency and the appearance of the vehicle.

SUMMARY

A fairing assembly is disclosed, wherein the fairing panel is suitable for use on a heavy duty vehicle having a cab mounted to a frame such that relative motion occurs between the cab and the frame during vehicle operation. The fairing assembly includes a fairing panel extending downwardly from a lower portion of the cab and a hinge for hingedly connecting an upper portion of the fairing panel to a lower portion of the cab. The hinge defines a hinge line extending in a generally longitudinal direction. The fairing assembly further includes a link. A first end of the link is rotatably connected to a lower portion of the fairing panel, and a second end of the link is rotatably connected to the frame. The link limits rotation of the fairing panel about the hinge line. The link itself rotates relative to the fairing panel to allow for relative motion between the frame and the cab.

Also disclosed is a truck having a frame and a sleeper mounted to the frame. The frame includes a frame rail extending in a longitudinal direction. When the vehicle is operated, relative motion occurs between the frame and the sleeper. A fairing assembly for the truck includes a fairing having an upper edge hingedly connected to the sleeper about a generally horizontal hinge line. The fairing assembly further includes a link having a first end rotatably secured to a lower edge of the fairing and a second end rotatably secured to the frame.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated when taken in conjunction with the accompanying drawings, wherein.

DETAILED DESCRIPTION

Embodiments of the present invention will now be described with reference to the drawings where like numerals correspond to like elements. Embodiments of the disclosed subject matter and appended claims are generally directed to fairing assembly suitable for mounting a fairing to a lower edge of the cabs and/or sleepers of vehicles such as Class 8 trucks. Although exemplary embodiments of the present disclosure and appended claims will be described hereinafter with reference to Class 8 trucks, it will be appreciated that aspects of the claimed subject matter have wide application, and therefore, may be suitable for use with many types of vehicles wherein a mounted fairing moves relative to surrounding structure. Accordingly, the following descriptions and illustrations herein should be considered illustrative in nature, and thus, not limiting the scope of the present disclosure, as claimed.

In the following description, numerous specific details are set forth in order to provide a thorough understanding of exemplary embodiments of the disclosed and claimed subject matter. It will be apparent to one skilled in the art, however, that many embodiments of the claimed subject matter may be practiced without some or all of the specified features. Although the vehicle depicted in FIG. 2 represents one of the possible applications for the disclosed and claimed subject matter, it should be appreciated that the particular features of the disclosed subject matter can be modified for use with any vehicle on which the inclusion of fairings would be appropriate.

Figure 1:
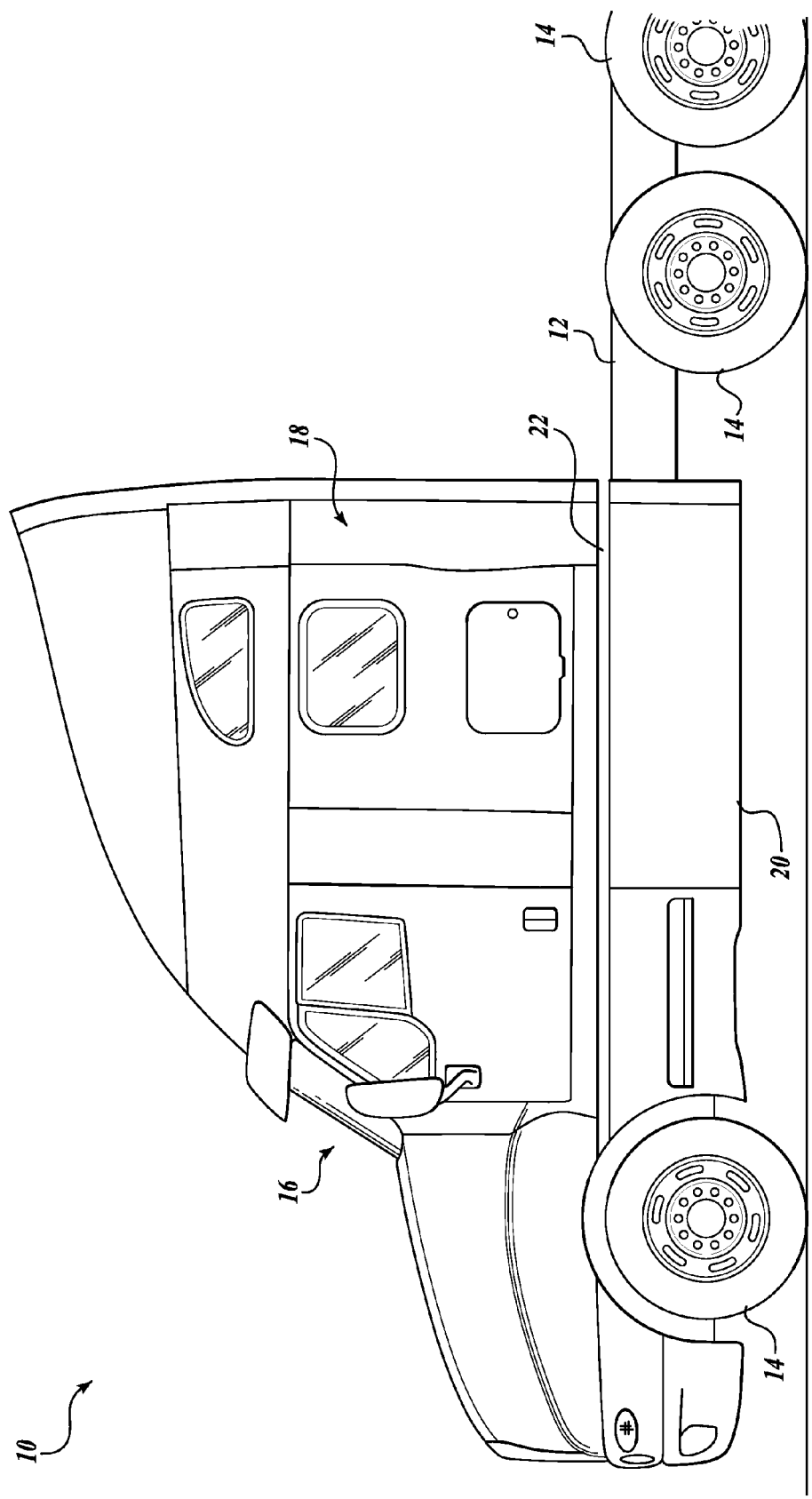
FIG. 1 is a side view of a vehicle with a known fairing assembly.
Figure 2:
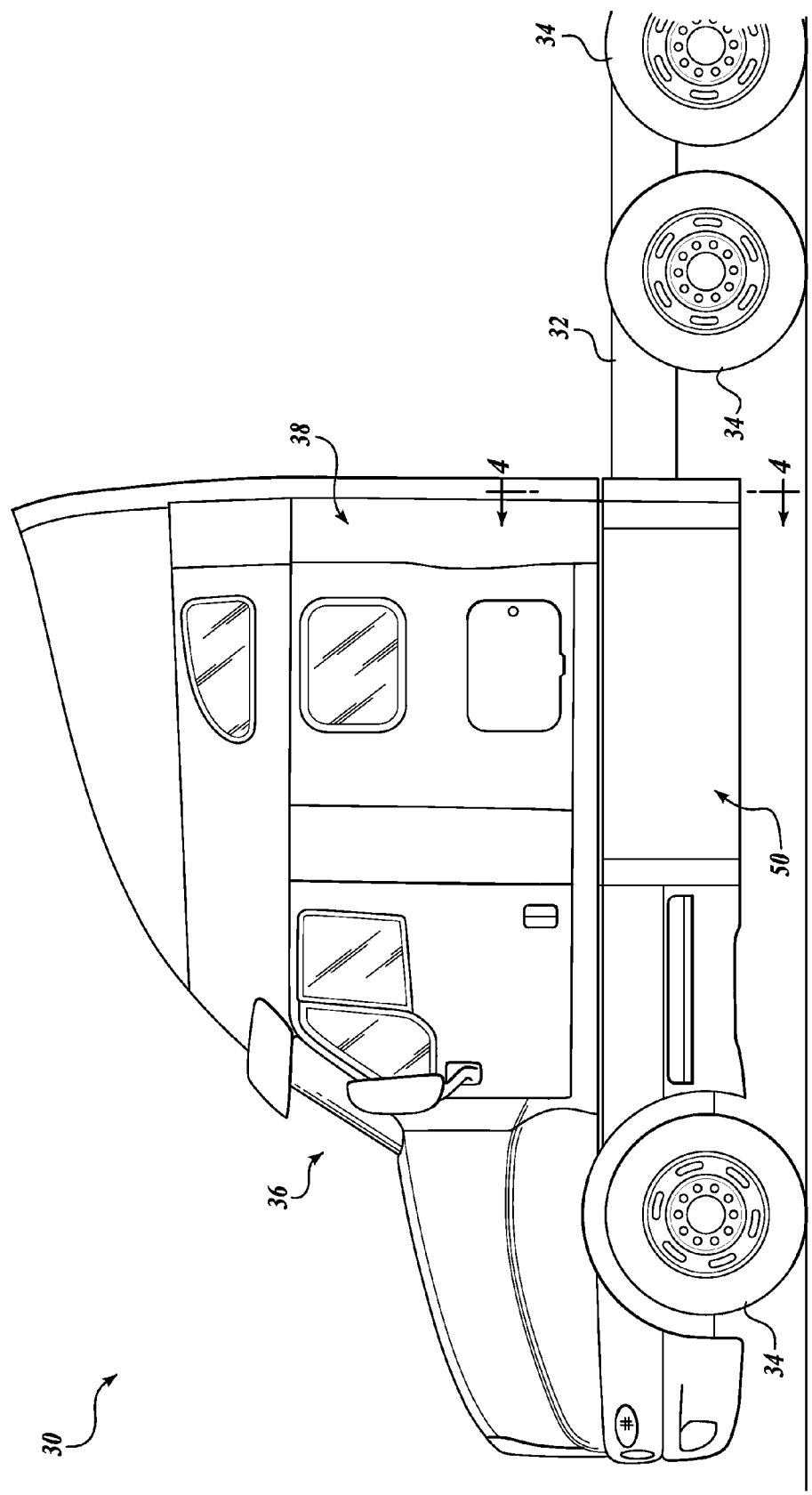
FIG. 2 is side view of a vehicle having an fairing assembly according to an exemplary embodiment of the present disclosure.

As shown in FIG. 2, a vehicle 30, such as a Class 8 truck, includes a frame 32 supported by a plurality of wheels 34 rotatably mounted thereto. A cab 36 and an optional sleeper 38 are secured to the frame 32 by a suspension system (not shown). The cab 36 provides a sheltered enclosure from which an operator controls the vehicle 30, and the sleeper 38 provides sleeping quarters and a living space for the operator. The suspension system provides a smoother ride for the vehicle operator by allowing relative motion to occur between the cab 36 and the frame 32 so that the operator is at least partially isolated from the motion of the frame 32 during vehicle operation.

For the sake of simplicity, fairing panels will hereinafter typically be referred to as being mounted to the vehicle sleeper 38; however, it should be appreciated embodiments are contemplated wherein the fairing panels are mounted to a lower surface of a vehicle cab 36, regardless of whether or not the vehicle has a sleeper 38, or to lower surfaces of both the cab 36 and the sleeper 38. Embodiments wherein the fairing panels are mounted to other structure that moves relative to the vehicle frame are also contemplated. Such embodiments should be considered within the scope of the disclosed and claimed subject matter.

Figure 3:
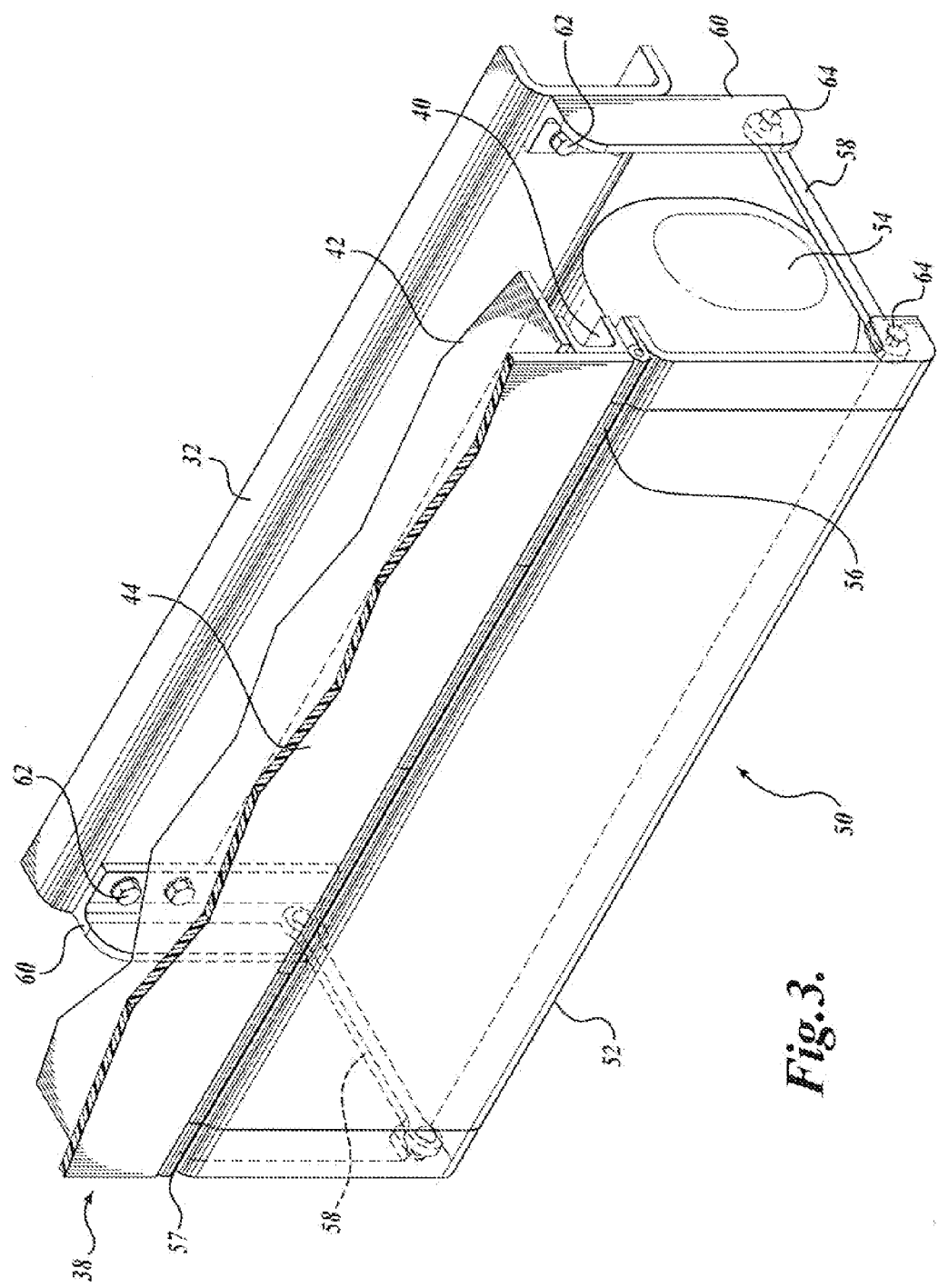
FIG. 3 is an isometric view of the fairing assembly shown in FIG. 2.
Figure 4:
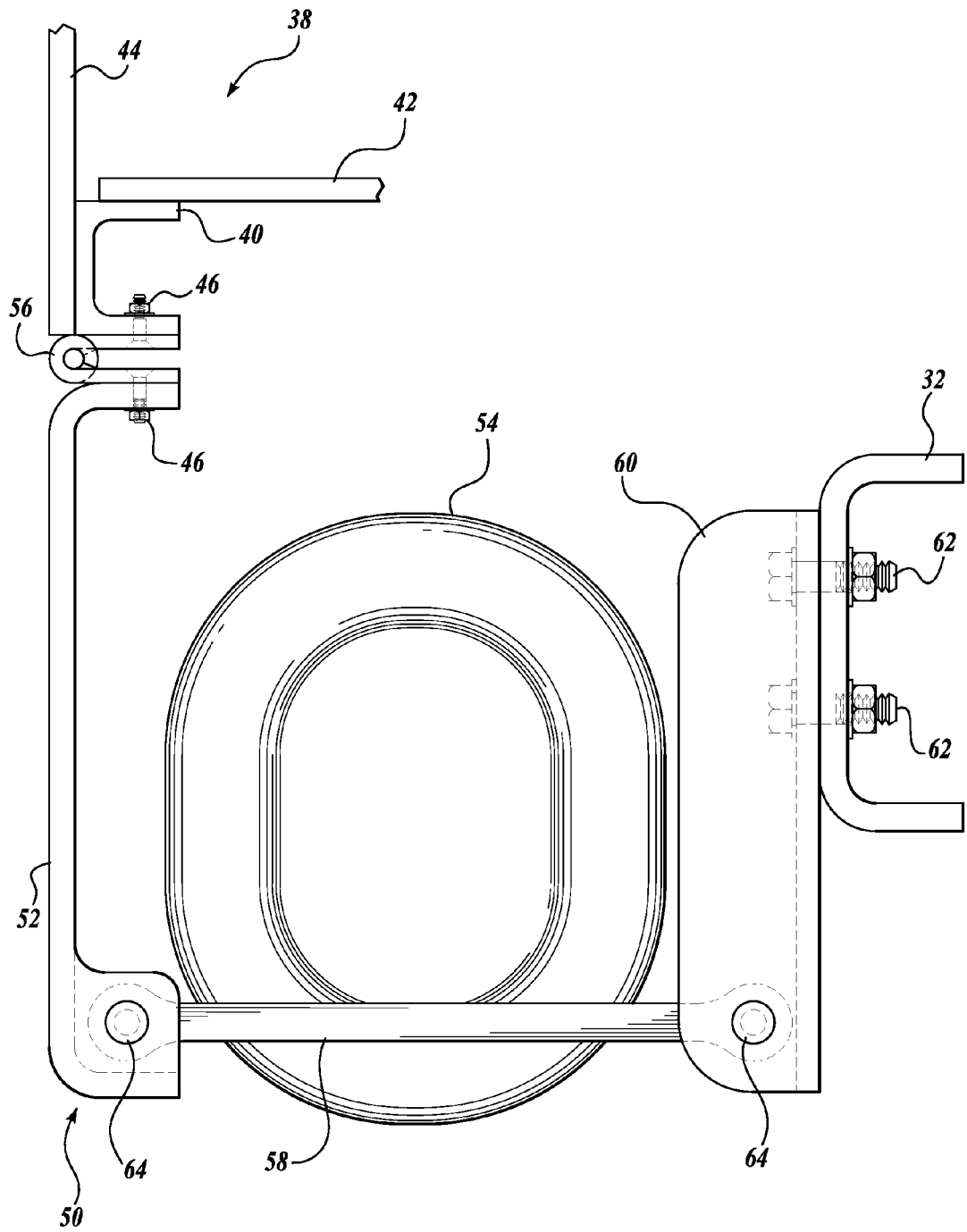
FIG. 4 is a cross-sectional view of the fairing assembly shown in FIG. 2.

FIGS. 3 and 4 show lower outboard portion of a typical sleeper configuration, wherein the sleeper 38 has a frame 40 located at the base of the sleeper 38. In the illustrated embodiment the sleeper frame 40 includes a C-channel positioned so that the web of the C-channel is substantially vertical, and the upper and lower flanges face inboard, toward the vehicle centerline. A floor panel 42 is supported by the upper surface of the sleeper frame 40, and the lower edge of a side panel 44 extends vertically downward to cover the outboard edge of the frame 40. Both the floor panel 42 and the side panel 44 are attached to the sleeper frame 40 with conventional fasteners. The illustrated sleeper 38 is exemplary only, and should be apparent that other sleeper configurations are possible. In this regard, one of skill in the art would readily be able to modify the disclosed fairing assembly for use with various other sleeper configurations.

Still referring to FIGS. 3 and 4, the fairing assembly 50 includes a fairing panel 52 hingedly coupled to a lower portion of the sleeper 38. The fairing panel 52 has a substantially flat outboard surface such that when the fairing panel is mounted to the vehicle 30, it serves as an extension of the side of the sleeper 38, thereby increasing the aerodynamic efficiency of the vehicle. The fairing panel 52 also improves the aesthetics of the vehicle 30 by covering the vehicle frame 32, and any components mounted thereto, such as fuel tanks 54, wiring, fluid lines, etc. The illustrated fairing panel 52 includes upper and lower flanges, which provide an unseen interface for the mounting hardware, as well as additional stiffness to the fairing panel. It should be appreciated that the illustrated fairing panel 52 is exemplary only, and the disclosed fairing mounting system can be modified to mount fairing panels of a wide variety of configurations. For example, the fairing panel need not be flat, but can instead be contoured to provide particular aerodynamic or aesthetic effect.

The fairing panel 52 is hingedly coupled to the sleeper 38 with one or more hinges 56. In this regard, first half of the hinge 56 is coupled to the lower flange of the sleeper frame 40 using conventional fasteners. A second half of the hinge 56 is coupled to an upper, generally horizontal surface of a fairing panel 52. Attaching the second half of the hinge 56 to a horizontal fairing surface hides the attachment fasteners from view; however, it should be appreciated that the hinge can be attached to any suitable portion of the fairing panel, including the vertical fairing web. In such a configuration, the lower portion of the hinge 56 may extend downwardly such that the hinge forms a 90° angle and is attached to an inner vertical surface of the fairing panel 52, thereby allowing the upper horizontal flange of the fairing panel to be omitted. The hinge is arranged so that the hinge line 57 is substantially horizontal and oriented along the longitudinal direction of the vehicle. It should be appreciated, however, that alternate embodiments are possible wherein the hinge is not horizontal, but instead is oriented at an angle relative to horizontal and/or the longitudinal direction of the vehicle.

In the illustrated embodiment, the hinge 56 is a "piano hinge," i.e., a single elongate hinge spanning all or substantially all of the length of the fairing panel 52. Other embodiments are contemplated wherein a series of hinges are used instead of a single hinge. In yet another embodiment, the hinge is one or more pieces of flexible material coupled to both the fairing panel 52 and the sleeper 38. The material, which can be fabric, a polymer, or any other suitable material, has sufficient strength to withstand normal operating loads experienced during operation, but is flexible enough to operate as a hinged connection between the sleeper 38 and the fairing panel 52.

The sleeper frame and the fairing panel are illustrated as being coupled to the hinge using conventional removable fasteners 46, however, it should be appreciated that any suitable mechanical fastening means may be utilized, including permanent fasteners, epoxy, or any other known fastener. Further, a portion or all of the hinge may be integrally formed with the fairing panel 52, the sleeper 38, or both. These and other embodiments are contemplated and should be considered within the scope of the present disclosure.

Still referring to FIGS. 3 and 4, one or more elongate links 58 are rotatably coupled at a first end to a lower portion of the fairing panel 52. The second end of each link 58 is rotatably coupled to the vehicle frame 32. In the illustrated embodiment a first link 58 is located at the forward end of the fairing panel 52, and a second link 58 is located at the rear end of the fairing panel 52. It should be appreciated that the number and location of links can vary according to factors such as the size of the fairing panel 52, the structure located behind the fairing panel, the flexibility of the fairing panel, and any other factors.

When the links 58 are installed, they restrain a lower edge of the fairing panel 52 to limit rotation of the fairing panel about the hinge line. Accordingly, the fairing panel 52 generally maintains its substantially vertical orientation. At the same time, the links 58 cooperate with the fairing panel 52 to form a linkage that articulates to accommodate relative motion between the frame 32 and the sleeper 38.

In the embodiment shown in FIGS. 3 and 4, the first and second links are positioned to be substantially horizontal. Because the bottom of the frame is located above the portion of the fairing panel 52 to which the link 58 is connected, a frame fitting 60 is coupled to the frame 32 and extends in a downward direction. In the illustrated embodiment, the frame fitting 60 is formed from L-shaped channel and is coupled at an upper end to the frame with known fasteners 62. The link 58 is rotatably coupled to the lower end of the frame fitting 60 so that the link is substantially horizontal when coupled to both the fairing panel 52 and the frame fitting.

Still referring to FIGS. 3 and 4, the links 58 of the illustrated embodiment are coupled for rotational movement about the fasteners 64 that attach the links to the fairing panel 52 and the frame fitting 60. Alternate embodiments are envisioned wherein one or both of the ends of at least one link 58 include a spherical joint to couple the link to the fairing panel 52 and the frame fitting 60. In another alternate embodiment, the link 58 is coupled to one or both of the fairing panel 52 and the frame fitting 60 with a flexible joint that allows relative motion between the link and the fairing panel and/or frame fitting. Flexibility in the joint can be achieved by the use of an elastomeric bushing or any other known method. In yet another embodiment, the link 58 is rigidly connected to the fairing panel 52 and/or the frame fitting 60, but is constructed to have sufficient flexibility so that the link elastically deforms to accommodate relative motion between the fairing panel and the frame 32. These and other alternate embodiments that allow for relative motion between the frame 32 and the lower edge of the fairing panel 52 are contemplated and should be considered within the scope of the present disclosure.

In order to gain access to the area behind currently known fairing panels 52, the fairing panels must typically be removed from the vehicle, a process that can be time consuming. Alternately, the fairing panels can include removable or hinged access panels or doors, but such configurations can prove costly due to the increased number of parts and additional assembly time. In contrast, the presently disclosed fairing system allows an operator to gain access to the area behind the fairing panel 52 by simply disconnecting the one or more links 58 from the fairing panel and then rotating the fairing panel about the hinge line until the fairing panel is in a raised position and no longer impedes access. Alternately, the operator can disconnect the link from the frame 32, thus allowing the fairing panel 52 to be rotated upwardly and out of the way. In order to improve access to the area behind the fairing panel 52, the links 58 are preferably coupled to the fairing panel and/or the frame 32 with commonly known removable fasteners 64, which may include threaded fasteners, quick-release pins, and any other suitable fastener. In yet another alternate embodiment, the hinge 56 that couples the fairing panel 52 to the sleeper 38 has one or more removable hinge pins. In this configuration, an operator can remove the hinge pins to uncouple the fairing panel 52 from the sleeper 38 and then rotate the panel downwardly about its connection to the links 50, thereby gaining access to the area behind the fairing panel.

While illustrative embodiments have been illustrated and described, it will be appreciated that various changes can be made therein without departing from the spirit and scope of the invention.

The embodiments of the invention in which an exclusive property or privilege is claimed are defined as follows:

1. In a heavy duty vehicle having a cab mounted to a frame, relative motion occurring between the cab and the frame during vehicle operation, and a fairing assembly extending downwardly from a lower portion of the cab, the fairing assembly comprising:
    (a) a fairing panel;
    (b) a hinge for hingedly connecting an upper portion of the fairing panel to a lower portion of the cab, the hinge defining a hinge line extending in a generally longitudinal direction; and
    (c) a link, a first end of the link being rotatably connected to a lower portion of the fairing panel, a second end of the link being rotatably connected to the frame, wherein the link (i) limits rotation of the fairing panel about the hinge line, and (ii) rotates relative to the fairing panel to allow for relative motion between the frame and the cab.

2. The fairing assembly of claim 1, wherein the hinge assembly is continuous hinge spanning substantially a length of the fairing.

3. The fairing assembly of claim 1, wherein the hinge assembly comprises a plurality of hinges.

4. The fairing assembly of claim 1, wherein the hinge assembly comprises a polymeric hinge.

5. The fairing assembly of claim 1, further comprising a second link, a first end of the second link being rotatably connected to the lower portion of the fairing panel, a second end of the second link being rotatably connected to the frame.

6. A fairing assembly for a truck, the truck having a frame and a sleeper mounted to the frame, the frame comprising a frame rail extending in a longitudinal direction, relative motion occurring between the frame and the sleeper when the vehicle is operated, the fairing assembly comprising:
    (a) a fairing having an upper edge hingedly connected to the sleeper about a generally horizontal hinge line; and
    (b) a link having a first end rotatably secured to a lower edge of the fairing and a second end rotatably secured to the frame.

7. The fairing assembly of claim 6, wherein the link (i) limits rotation of the fairing about the hinge line, and (ii) and rotates relative to the fairing to allow for relative motion between the sleeper and the frame.

8. The fairing assembly of claim 6, wherein relative motion between the frame and the sleeper rotates the fairing about the hinge line.

9. The fairing assembly of claim 6, further comprising a continuous hinge spanning substantially a length of the fairing to hingedly connect the fairing to the sleeper.

10. The fairing assembly of claim 6, further comprising a plurality of hinges to hingedly connect the fairing to the sleeper.

11. The fairing assembly of claim 6, further comprising a polymeric hinge to hingedly connect the fairing to the sleeper.

12. The fairing assembly of claim 6, further comprising a second link, a first end of the second link being pivotally connected to the lower portion of the fairing, a second end of the second link being pivotally connected to the frame.

* * * * *